May 18, 1943. G. WÜNSCH ET AL 2,319,363
DEVICE FOR REMOTE CONTROL
Filed Aug. 24, 1939 3 Sheets-Sheet 1

Inventor:
Guido Wünsch
Adolf Krüssmann
By A. D. Adams Atty

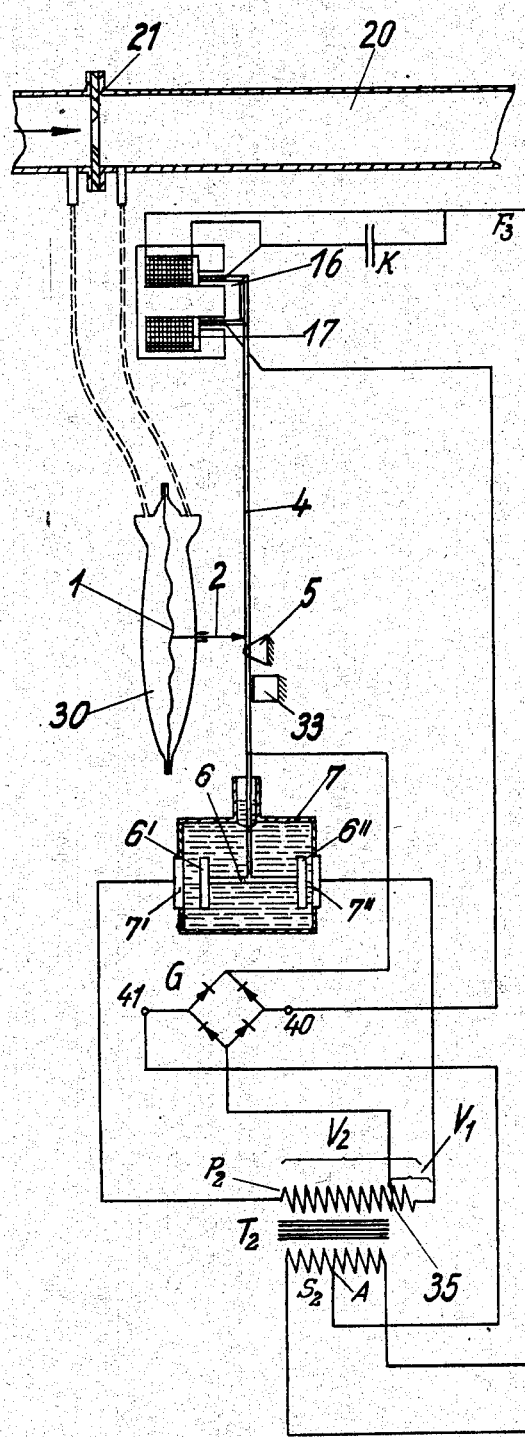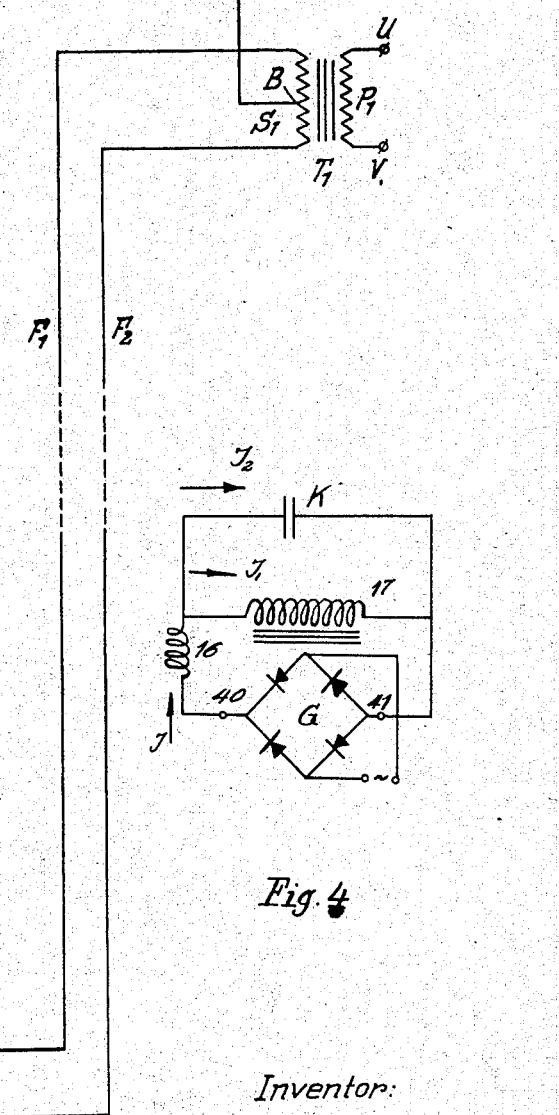

Patented May 18, 1943

2,319,363

UNITED STATES PATENT OFFICE 2,319,363

DEVICE FOR REMOTE CONTROL

Guido Wünsch and Adolf Krüssmann, Berlin, Germany; vested in the Alien Property Custodian Application August 24, 1939, Serial No. 291,784
In Germany August 27, 1938

4 Claims. (Cl. 177—351)

The invention relates to improvements in devices and systems in which a controlling impulse is converted into a direct electric current and in which electrically operated means are provided responsive to said direct current for compensating the controlling impulse.

In such devices the controlling impulse and the direct current are mutually balanced so that the direct current represents an exact measure of the controlling impulse. Devices of this type may be used where it is desirable to convert controlling impulses into proportional currents. Such devices are preferably suitable for remote transmission of measuring values because the compensating direct current is independent of variations in the resistances in the direct current circuit.

An object of the invention is to overcome the difficulties arising in the conversion of the controlling impulse into direct current, more specifically the difficulty of controlling direct current voltages in the immediate vicinity of zero with the required accuracy.

Another object of the invention is to avoid a re-setting force in the system as otherwise the operation of the device becomes dependent on the properties of the members such as springs and the like supplying the re-setting forces.

A further object is to develop the relay for converting the controlling impulses into current impulse in such manner that the relay controls a considerable electric power with a view to avoiding additional current amplifying means. Furthermore the invention relates to the construction of the relay so as to increase its reliability during operation and the accuracy of the measurement throughout the entire measuring range.

Other aims refer to the use of a dynamometer with an iron circuit as the electrically operated means compensating the controlling impulses for obtaining measuring values which are the square root of the controlling impulses and to a particular development for ensuring the exact counteracting of the compensating means.

Finally, the invention refers to a particular embodiment of a remote-transmission device in which the measuring instrument and the feed for the electric power source are both arranged in the measuring station and to means for superposing the feeding circuit and the measuring circuit.

The invention is more fully explained in the accompanying drawings of which

Figure 1:
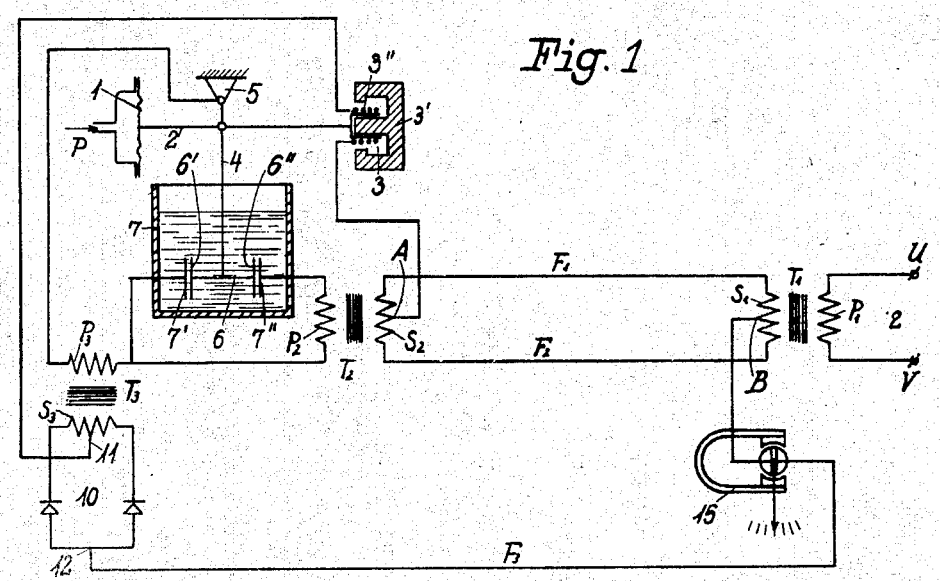
Figure 5:
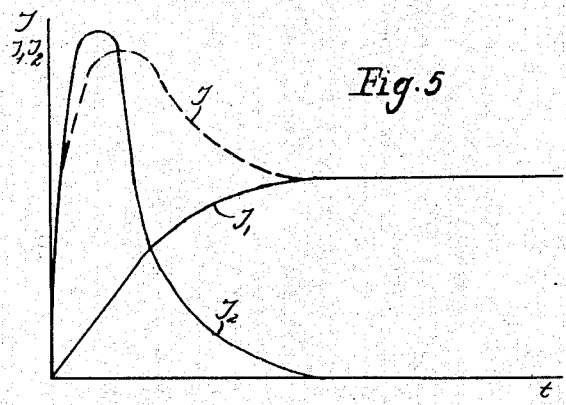
Figure 3:
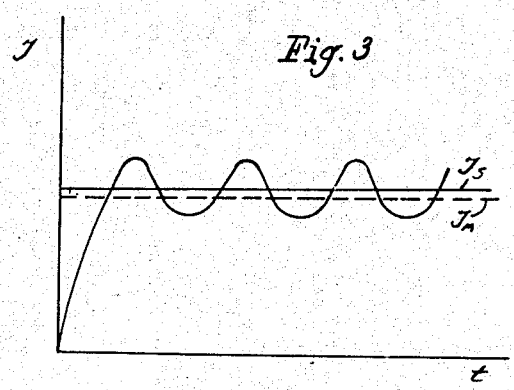
Figure 2:
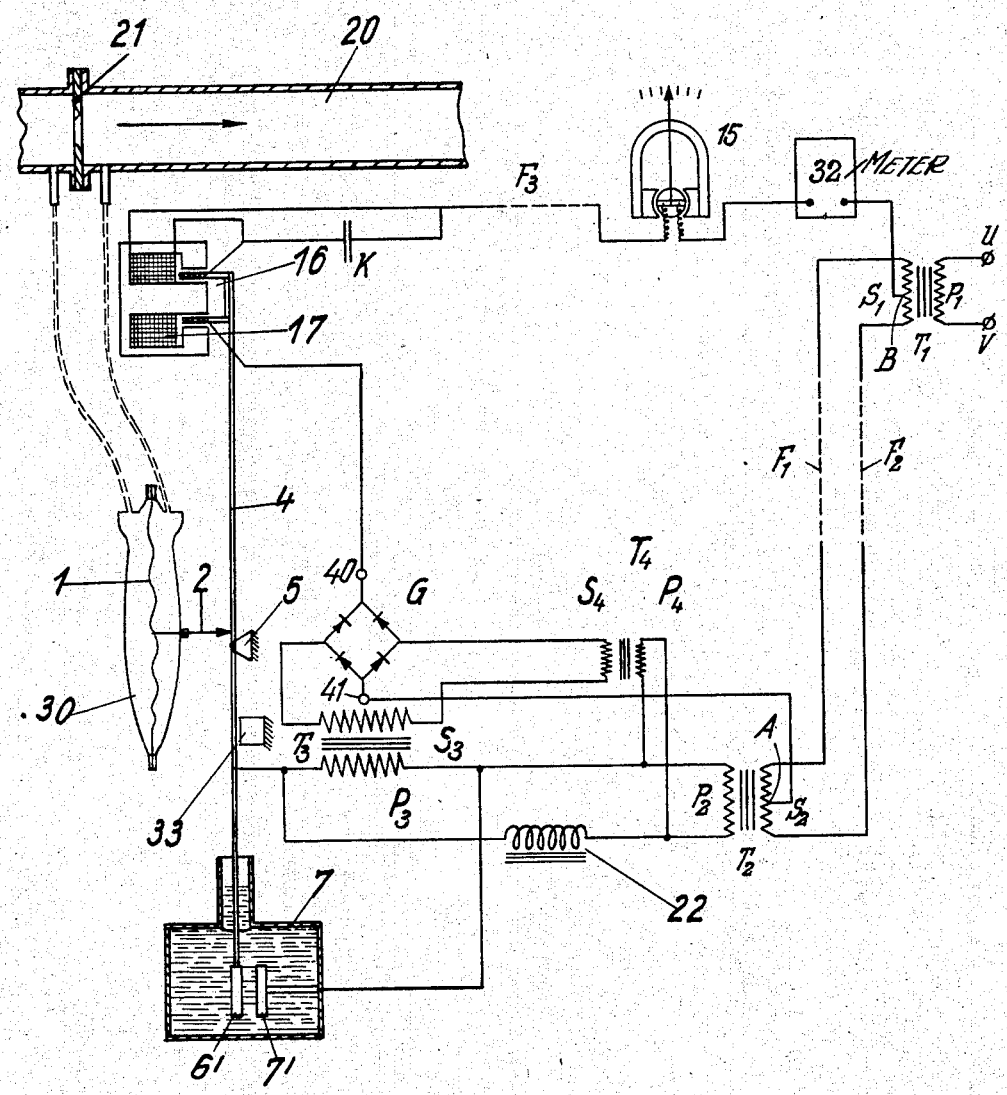

Fig. 1 is a diagrammatic view showing an embodiment of the device with the complete wiring according to the invention, Fig. 2 is a similar view of a modification, Figs. 3, 4 and 5 are diagrammatic views to further illustrate the operation of the device according to Fig. 2, and Fig. 6 is a diagrammatic view of a modification of the device as represented in Figs. 1 and 2.

According to Fig. 1 the measuring value for remote transmission is assumed to be a pressure P acting upon a diaphragm 1. The diaphragm 1 is connected to one end of a rod 2, the other end of which is secured to an electric coil 3″ of an electro-magnetic system 3. The electro-magnetic system 3 has a permanent magnet 3′, in the field of which a coil 3″ is movably mounted. The coil 3″ is energized with direct current and is moved in a direction opposed to that of the movement of the diaphragm 1 for counterbalancing the pressure P.

A conducting lever 4 is supported at 5 and articulately connected to the rod 2; said lever forming a part of a liquid potentiometer acting as a relay. This liquid potentiometer consists of a liquid-filled vessel 7 on the inner walls of which are rigidly mounted two electrodes 7′ and 7″. The conducting lever 4 carries at its free end a conducting rod 6 arranged at right angles to said lever, the latter carrying two electrodes 6′, 6″ which are arranged in spaced relationship and facing the two electrodes 7′, 7″, respectively.

The electrodes 7′, 7″ of the relay 7 are energized from an alternating current power source by means of the center tapped transformer $T_1$, the remote-transmission lines $F_1$, $F_2$ and the center tapped transformer $T_2$. In response to the deflection of the diaphragm 1, a variable alternating current tension is produced between the movable center electrode 6′ and the outer electrode 7′ this tension being conducted to the primary winding $P_3$ of the transformer $T_3$. The secondary winding $S_3$ of the transformer $T_3$ is connected to the full-wave rectifier 10. The electric center tap 11 of the secondary winding $S_3$ is connected with the center tap A of the secondary winding $S_2$ of the transformer $T_2$ by means of the coil 3″. The center tap B of the secondary winding $S_1$ of the transformer $T_1$ is connected with the electric center tap 12 of the rectifier 10 by means of the direct current ammeter 15 and the transmission line $F_3$. Thus the direct current supplied by the rectifier 10 flows from the center tap 11 of the secondary winding of the transformer $T_3$ by means of the coil 3″, to the electric center tap A of the secondary winding of the transformer $T_2$. Here the current divides and flows through the remote-transmission lines $F_1$, $F_2$ to the center B of the secondary winding of the transformer $T_1$ and from there to the indicating instrument 15 and the remote-transmission line $F_3$ to the rectifier center tap 12. In this arrangement the feeding circuit and the measuring or compensating circuit, respectively, are superposed. The instrument 15 and the feeding transformer $T_1$ are arranged in the central measuring station. As will be seen, no re-setting elements are provided.

The described arrangement operates as follows: The pressure acting on the diaphragm 1 is to be indicated as current value on the instrument 15. The measuring pressure controls the liquid potentiometer 7 by means of the rod 2 and the lever 4. Between the electrodes 6' and 7', i. e. at the primary winding of the transformer $T_3$, an alternating current tension will consequently exist which is dependent on the position of the lever 4, that is on the magnitude of the measuring pressure. A corresponding direct current tension is produced between the center 11 of the transformer and the rectifier center tap 12, this tension producing the flow of direct current aforementioned, thereby generating in the coil 3" a counterbalancing force. By using a liquid potentiometer, a considerable electric potential may be obtained between the two electrodes 6', 7' so that an additional current amplifying means may be dispensed with. Under the influence of the measuring pressure on the one hand and of the counteracting pressure on the other hand the lever 4 and with it the alternating current tension at $P_3$ attain a condition of equilibrium when the current in the coil 3" is proportional to the measuring pressure. As however the same current flows in the coil 3" as in the ammeter 15, the latter always indicates a value proportional to the measuring pressure at 1 independently of conduit resistances and other characteristics.

In the described embodiment of the measuring device, a relay in the form of a liquid potentiometer has the advantage that the relay is of simple and reliable construction. Such a liquid potentiometer renders possible the adjusting of considerable electric power directly and minutely. If the feeding tension at the electrodes 7', 7" of the potentiometer fluctuates, the center electrodes 6', 6" are deflected more or less until a balance between the measuring value and the measuring current is achieved.

The described arrangement is capable of being modified in many ways. Thus instead of the liquid potentiometer another relay system may be used, such as for instance a glow discharge potentiometer or the like. The measuring value need not of course be a pressure. It may consist of any force or line of displacement.

It naturally falls within the scope of the invention to use a regulator or regulating impulse transmitter instead of the indicating instrument 15.

As a modification of the invention, an electric dynamometer may be likewise employed as a counterbalancing member consisting in a movable coil and an electro-magnetically excited field, the exciting coil of which is inserted in the measuring or compensating circuit together with the movable coil. In this case the counterbalancing force is the square of the measuring current intensity. The current value shown at 15 is thus the square root of the measuring value.

This offers special advantages with respect to measuring values having a square characteristic, for instance in determining a quantity of a flowing medium on the basis of measuring the pressure difference on both sides of a restriction. Thus it is possible to indicate the quantity at the measuring instrument on a linearly graduated scale.

Fig. 2 shows a device for measuring a quantity of a flowing medium. 20 represents a conduit line through which a medium passes in the direction of the arrow and the quantity of which has to be measured. 21 is an orifice plate in the line 20, the difference in pressure between the two sides of the orifice plate acting upon the differential pressure meter 30. The slack diaphragm 1 of this meter acts by means of a rod 2 upon a lever 4, rotatably mounted at 5, in the immediate vicinity of the pivot point of said lever. The lower end of the lever 4 carries an electrode 6' facing a fixedly mounted electrode 7' in such a way that the distance between the two electrodes may be varied if the lever is deflected. Both electrodes are immersed in a vessel 7 filled with an electrolyte. The liquid resistance created between the two electrodes is connected in series with a resistance 22 in the form of an induction coil. This series connection is supplied with electrical energy by the alternating current network U, V by means of the center tapped transformer $T_1$, the mains $F_1$, $F_2$ and the center $p$ tapped transformer $T_2$. The alternating current voltage drop between the two electrodes resulting from a movement of the lever 4 in response to a measuring impulse is connected to the primary winding $P_3$ of the transformer $T_3$, the secondary winding $S_3$ of which feeds a full-wave rectifier G.

A coil 16 is secured to the upper end of the lever 4 thus forming a long lever arm. A fixed electro-magnetic coil 17 is provided, in which the field coil 16 is movable. A series connection exists between the output terminal 40, 41 of the rectifier G, the coils 16 and 17, an ammeter 15—which is connected to coil 17 by the main $F_3$—and the direct current meter 32. The meter 32 is connected to the center tap B of the secondary winding $S_1$ of the transformer $T_1$, while the output terminal 41 of the rectifier G is connected to the center tap A of the secondary winding of the transformer $T_2$. Therefore, the feeding circuit and the measuring or compensating circuit are superposed in the same manner as shown in Fig. 1. Another transformer $T_4$ is provided, whose primary $P_4$ is energized by the transformer $T_2$ and whose secondary $S_4$ is connected in series with the secondary $S_3$ of the transformer $T_3$. The function and operation of this transformer will be described later.

The force delivered by the dynamometric system 16, 17 is proportional to the square of the direct current flowing in the measuring circuit and counteracts the force acting upon the diaphragm 1 of the differential pressure meter 30. The counteracting force due to the displacement of the diaphragm 1 in response to the differential pressure increases until equilibrium is established between the counteracting force and the differential pressure. The direct current in the measuring circuit consequently is an exact measure of the square root of the differential pressure. The differential pressure being proportional to the square of the quantity flowing through the orifice plate, i. e. the quantity to be measured being thus proportional to the square root of the differential pressure, the deflections of a conventional ammeter 15 in the measuring circuit are a measure of the instantaneous quantity of the flow, and the deflections of the electric meter 15 are a measure of the total quantity flowing through the conduit during a certain period of time. The ammeter 15 has a linearly graduated scale indicating the quantity values.

A capacity K is connected parallel to the exciting coil 17 of the dynamometric instrument and operates as follows:

Due to the high inductive resistance of the exciting coil of a dynamometer with iron circuit, the creation of the counterbalancing force is retarded as every variation in the current flowing through the exciting coil creates an inductive counteracting electro-motive force only permitting a gradual increase of the measuring current I to the value $I_s$ given by the direct current voltage delivered by the rectifier and by the ohm resistance of the measuring circuit. Consequently the movable electrode of the liquid resistance deflects too far due to the influence of the measuring impulse, whereby the magnitude of the compensating direct current and consequently of the counteracting force will be too large. Thus on account of the afore-mentioned retardation in the increase of the current, a hunting or oscillation is produced. Fig. 3 shows the curve $I=f(t)$, where I is the current flowing through the dynamometer and A the time. It is obvious that due to the dependence of the counteracting force upon the square of the current intensity in the dynamometer, the average value of the compensating current considerably deviates from the afore-mentioned current value $I_s$. Thus the measuring value is falsified as the indicating instrument is responsive to the average value $I_m$. If, however, according to the invention a capacity is connected parallel to the exciting coil of the dynamometer with an iron circuit, the retardation is considerably reduced and hunting avoided. Experience has shown that in using a capacity inserted parallel to the exciting coil of the dynamometer the oscillations of the measuring system fade away within the space of 0.15 second and the requisite value $I_s$ is then reached.

This process may be more fully explained by reference to Figs. 4 and 5. According to Fig. 4 the movable coil 16 and the fixedly mounted coil 17 of the dynamometric instrument are connected in series with the output terminals 40 and 41 of the rectifier G. The capacity K is connected in parallel to coil 17. The current I flowing through the coil 16 is composed of the current $I_1$ flowing through coil 17 and the current charging the capacity K. While the current $I_1$ gradually increases to a maximum, current $I_2$ gradually decreases from its maximum towards zero. Therefore the resulting current I flowing through coil 16 increases much more rapidly than the current in the exciting coil 17. Hence the movable coil 16 delivers the requisite compensating force without delay, whereby the inaccuracies referred to above are avoided.

The liquid resistance represented in Fig. 2 has the following advantage over the liquid resistance shown in Fig. 1. In the liquid potentiometer of Fig. 1 two liquid resistances are provided—one between the electrodes 6', 7' and 6'', 7''—only one—6', 7'—serving for controlling the alternating current power, while the current passing through the other liquid resistance 6'', 7'' produces an undersirable power loss and a heating effect prejudicial to safety. In contradistinction thereto, the relay according to Fig. 2 possesses only one liquid resistance, that is between the electrodes 6', 7', and consequently the power loss and heat development are considerably less in comparison. The provision of the induction coil 22 connected in series with the liquid resistance according to Fig. 2 affords the advantage that the loss of power is considerably reduced.

Actually many types of relays do not control correctly in the zero range. If liquid resistances are used as relays, the electro-magnetic counteracting force tends to bring two electrodes into direct contact. Therefore these two electrodes should be in direct contact if no measuring impulse is present. Experience has shown that in such a case no reliable contact is attainable as the compensating force of coils 3'' or 16, respectively, is very small under these circumstances. If furthermore the two electrodes are in very close proximity, considerable heat is developed in the liquid which results in the formation of bubbles and irregularity of resistance. In this way an exact measuring of small impulses becomes impossible. Due to the unreliable contact between the electrodes, a remainder of direct current is produced in the measuring circuit although the impulse is zero. This is particularly disturbing if an integrating meter for measuring quantity values is inserted in the measuring circuit, as this meter is then continuously in action even when the quantity measuring impulse is nil. In order to avoid this drawback, according to the invention a part of the voltage supplied by the relay is compensated by an auxiliary electromotive force. For this purpose in the arrangement according to Fig. 2 and additional alternating voltage is created by means of a transformer $T_4$ energized by the transformer $T_2$, said voltage counteracting the voltage delivered by the secondary winding of the transformer $T_3$. In consequence thereof the movable electrode 6' assumes its initial position while it is yet a certain distance away from the opposing electrode 7', in which initial position the rectifier G and the measuring circuit are void of current. A stop 33 is provided which prevents the motion of the movable electrode beyond said initial position depending on the amount of the auxiliary electro-motive force. In this arrangement the current in the measuring circuit is zero if the measuring impulse is zero, and even the measurement of small impulses becomes reliable.

Fig. 6 shows a modification of the embodiment of the invention described in Fig. 2 in combination with a liquid potentiometer similar to that shown in Fig. 1. The full-wave rectifier G is inserted between the connections 6 of the movable electrodes 6', 6'' of the potentimeter and a tap 35 of the primary $P_2$ of the transformer $T_2$, while the output terminals 40, 41 of the rectifier are connected in series with the dynamometric system 16, 17, the ammeter 15 and the current meter 32. Assuming that the total deflection of the central electrode amounts to 6 mm. and that it is desired that the center electrode reaches its initial position at a distance of 0.5 mm. from the electrode 7', the tap 35 divides the tension of the primary of the transformer $T_2$ so that the ratio between a voltage $V_1$ of the primary $P_2$ and the voltage $V_2$ at the primary $P_2$ corresponds to the ratio between the distance of 0.5 mm. to the total deflection of 6 mm. As coil 16 tends to displace the electrode 6'' to the right, the tap 35 is provided in the proximity of the right end of the winding $P_2$. In this arrangement coil 16 deflects the center electrode to the right until it has reached the same potential as the tap 35, i. e. until the distance between the electrodes 6" and 7" is 0.5 mm.

Instead of using two centertapped transformers in the arrangements according to Figs. 1, 2 and 6, center-tapped induction coils may be used, one at the transmitting station connected to said relay, the other at the receiving station connected to the feeding alternating current power source, the two induction coils being connected parallel to each other by the mains. The coils 3" or 16, 17, respectively, of the compensating device, the rectifier G and the measuring instruments 15 or 32, respectively, or both are in this case connected in series between the center taps of these induction coils.

What is claimed is:

1. In a device for measuring a physical condition the combination with a condition responsive device; a relay acted upon by said device; an alternating current circuit controlled by said relay for obtaining an alternating current electromotive force varying in dependence on said physical condition; an auxiliary alternating current circuit delivering a constant alternating electro-motive force; rectifying means controlled by the difference of both electro-motive forces and a direct current responsive instrument and electrically operated compensating means both of which are connected in series to the output terminals of said rectifying means; said compensating means counteracting said condition responsive device.

2. In a device for measuring a physical condition the combination with a condition responsive device; a potentiometric resistance having a movable tap adjustable by said device; and alternating current fed transformer having a tapped secondary winding, said resistance being connected in parallel to said winding; rectifying means connected between the movable tap of said resistance and the tap of the transformer winding and a direct current responsive instrument and electrically operated compensating means both of which are connected in series to the output terminals of said rectifying means; said compensating means counteracting said condition responsive device.

3. In a device for measuring a physical condition the combination with a condition responsive device; a relay acted upon by said device; an alternating current circuit controlled by said relay for obtaining an alternating current electromotive force varying in dependence on said physical condition, rectifying means; electrically operated compensating means counteracting said condition responsive device and a direct current responsive instrument both of which are connected in series to the output terminals of said rectifying means; an auxiliary alternating current circuit delivering a constant alternating electro-motive force; said rectifying means being controlled by the difference of both electromotive forces for reducing the resultant control voltage of the rectifying means and therewith the compensating force of said electrically operated compensating means to zero at a given deflection of the relay from one of its end positions, this deflection defining the initial position of the relay; and a stop provided to limit the deflection of the relay until its initial position has been reached.

4. In a device for measuring a physical condition the combination with the condition responsive device; a relay acted upon by said device; an alternating current circuit controlled by said relay for obtaining an alternating current electro-motive force varying in dependence on said physical condition; rectifying means controlled by said alternating electro-motive force; a direct current responsive instrument; an electrical dynamometer having a coil with an iron core and a second coil movable in the electro-magnetic field of said first-mentioned coil, both coils being connected in series with said direct current responsive instrument; said series connection being energized by said rectifying means; and a capacity connected parallel to said first-mentioned coil for compensating the retardation of the current increase in said dynamometer due to its inductance, said electrical dynamometer creating an electro-magnetic force counteracting said condition responsive device.

GUIDO WÜNSCH.
ADOLF KRÜSSMANN.